United States Patent
Chan

(10) Patent No.: US 12,470,147 B2
(45) Date of Patent: Nov. 11, 2025

(54) TWO-STAGE POWER SUPPLY WITH SECOND PARALLEL COUPLED INDUCTOR FOR DYNAMIC NOISE SUPPRESSION

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 390 days.

(21) Appl. No.: 18/187,685

(22) Filed: Mar. 22, 2023

(65) Prior Publication Data
US 2023/0308024 A1  Sep. 28, 2023

(30) Foreign Application Priority Data
Mar. 28, 2022 (TW) ................... 111111540

(51) Int. Cl.
*H02M 3/335* (2006.01)
*H02M 1/00* (2007.01)
*H02M 3/00* (2006.01)

(52) U.S. Cl.
CPC ..... *H02M 3/33569* (2013.01); *H02M 1/0058* (2021.05); *H02M 1/007* (2021.05); *H02M 3/01* (2021.05)

(58) Field of Classification Search
CPC ...... H02M 3/156; H02M 3/157; H02M 3/158; H02M 3/33571; H02M 1/36; H02M 3/335; H02M 1/0064; H02M 3/01–015; H02M 3/33569; H02M 1/0058; H02M 1/007
See application file for complete search history.

(56) References Cited

U.S. PATENT DOCUMENTS 9,931,951 B2 * 4/2018 Khaligh ............ H02M 3/33584
10,965,141 B2 * 3/2021 Yang ................... H02M 3/3376

FOREIGN PATENT DOCUMENTS

| CN | 110752760 | | 2/2020 |
|----|-----------|---|--------|
| TW | I695630 | | 6/2020 |
| TW | I698076 | | 7/2020 |
| TW | 1708466 B | * | 10/2020 |
| TW | I706408 | | 10/2020 |

* cited by examiner

*Primary Examiner* — Alex Torres-Rivera
*Assistant Examiner* — Ularislao Cordova
(74) *Attorney, Agent, or Firm* — JCIPRNET

(57) ABSTRACT

Provided is a power supply including a boost circuit and an LLC converter. The LLC converter includes a first inductor, a first switch, and a second switch. The LLC converter controls the first switch and the second switch according to the zero-voltage switching rule, so as to convert a boosted power supply provided by the boost circuit to an output power. The first inductor is inductively coupled with a boost inductor of the boost circuit to obtain the first energy. In response to the first energy, a time point when a first terminal and a second terminal of the first switch have zero voltage difference is delayed, such that a turn-on time point of the second switch lags behind a turn-on time point of a power switch of the boost circuit.

10 Claims, 4 Drawing Sheets

TWO-STAGE POWER SUPPLY WITH SECOND PARALLEL COUPLED INDUCTOR FOR DYNAMIC NOISE SUPPRESSION

CROSS-REFERENCE TO RELATED APPLICATION

This application claims the priority benefit of Taiwan application serial no. 111111540, filed on Mar. 28, 2022. The entirety of the above-mentioned patent application is hereby incorporated by reference herein and made a part of this specification.

BACKGROUND

Technical Field

The present disclosure relates to a power conversion technology, particularly to a power supply.

Description of Related Art

When the power supply has a higher output power, it needs to meet the power factor requirements set by Energy Star, and the power supply is thus designed to have a two-stage structure. While the front stage is a boost power factor corrector with constant frequency switching, the latter stage is a resonant LLC converter with frequency conversion switching.

Due to its higher output load (or the output power), a LLC converter has lower switching frequency. And when the switching frequency is lowered to a point where the switch of the LLC converter is turned on at the same time as the power switch of the boost power factor corrector, audible noise is often generated, because the energy of the LLC converter builds up simultaneously with the energy of the boost power factor corrector. In this light, a power supply is proposed to control the dynamic noise based on the load state to improve the problems encountered in the conventional design.

SUMMARY

The disclosure provides a power supply capable of suppressing dynamic noise based on a load state.

The power supply of the disclosure includes a boost circuit and an LLC converter. The boost circuit includes a boost inductor and a power switch. The boost circuit operates in response to the switching of the power switch to boost a rectified power supply and generate a boosted power supply. The LLC converter is coupled to the boost circuit. The LLC converter includes a first inductor, a first switch, and a second switch. The LLC converter controls the first switch and the second switch according to a zero-voltage switching (ZVS) rule to convert the boosted power supply to an output power supply. The first inductor is inductively coupled with the boost inductor to obtain a first energy. In response to the first energy, the time point when a first terminal of the first switch and a second terminal of the first switch have zero voltage difference is delayed, such that the turn-on time point of the second switch lags behind the turn-on time point of the power switch.

Based on the above, the first inductor of the LLC converter is inductively coupled with the boost inductor of the boost circuit to obtain the first energy, and in response to the first energy, the time point when the first terminal of the first switch and the second terminal of the first switch have zero voltage difference is delayed dynamically, such that the turn-on time point of the second switch is also delayed dynamically. In this way, the turn-on time point of the second switch may lag behind the turn-on time point of the power switch, thereby reducing the annoying noise caused by the second switch and the power switch turned on at the same time.

To make the above-mentioned features and advantages of the disclosure more comprehensible, the embodiments are described as follows in detail with reference to the following drawings.

DESCRIPTION OF THE EMBODIMENTS

Figure 1:
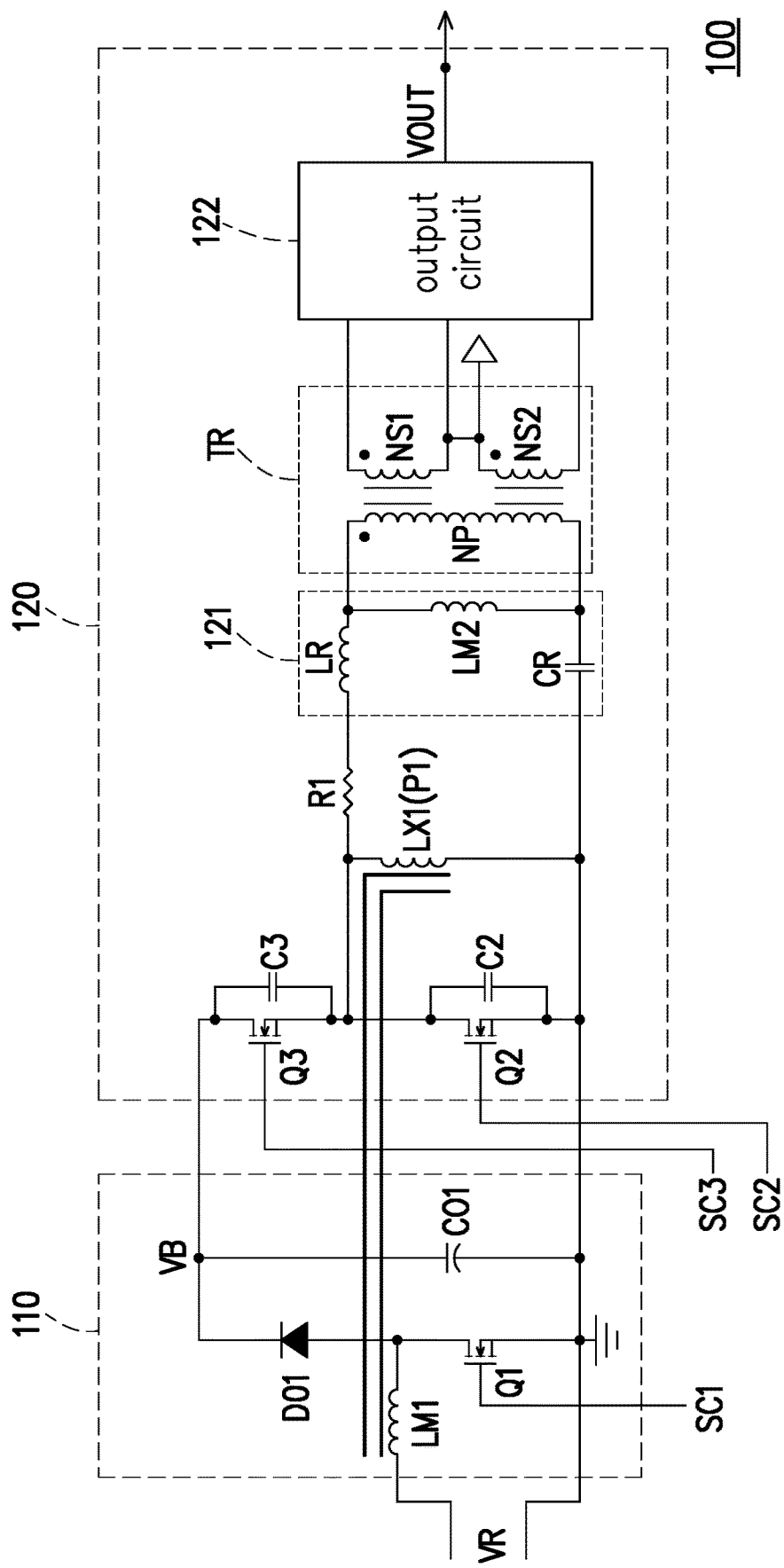
FIG. 1 is a schematic diagram of a power supply according to a first embodiment of the disclosure.

Some embodiments of the disclosure are described in detail hereinafter with reference to the drawings. Reference numerals in the following description may be regarded as the same or similar elements when the same reference numerals appear in different drawings. These embodiments constitute only part of the disclosure and do not disclose all possible embodiments of the disclosure. Rather, these embodiments are only examples of the claims of the disclosure.

Please refer to FIG. 1. FIG. 1 is a schematic diagram of a power supply according to a first embodiment of the disclosure. In this embodiment, the power supply 100 includes a boost circuit 110 and an LLC converter 120. The boost circuit 110 includes a boost inductor LM1 and a power switch Q1. The boost circuit 110 operates in response to the switching of a power switch Q1 to boost a rectified power supply VR to generate a boosted power supply VB. The LLC converter 120 is coupled to the boost circuit 110. The LLC converter 120 includes a first inductor LX1, a first switch Q2, and a second switch Q3. The LLC converter 120 controls the first switch Q2 and the second switch Q3 according to the zero-voltage switching (ZVS) rule, so as to convert the boosted power VB to generate an output power VOUT.

In this embodiment, the first inductor LX1 is inductively coupled with the boost inductor LM1 to obtain a first energy P1. For example, the first inductor LX1, the boost inductor LM1, and a magnetic conductive element (e.g., an iron core) form an inductive coupling circuit, but the disclosure is not limited to this example.

In this embodiment, the time point when the first terminal and the second terminal of the first switch Q2 have zero voltage difference is delayed dynamically in response to the first energy P1. Therefore, according to the ZVS rule, the dynamic delay of the time point of zero voltage difference as described above also causes the turn-on time point of the second switch Q3 to delay dynamically. In other words, the turn-on time point of the second switch Q3 is delayed in response to the load state of the booster circuit 110. Therefore, the turn-on time point of the second switch Q3 lags behind the turn-on time point of the power switch Q1. In other words, due to the first energy P1, the first time point when the second switch Q3 goes from the off state to the on state is different from the second time point when the power switch Q1 goes from the off state to the on state, according to the ZVS rule. The first time point lags behind the second time point.

Note that as the first time point and the second time point do not happen simultaneously, the energy at the boost inductor LM1 and the energy at the LLC converter 120 (i.e., the resonant tank 121) do not start building up at the same time. Therefore, this embodiment dynamically suppresses the noise generated by the energy of the boost inductor LM1 and the energy at the LLC converter 120 building up at the same time due to the first energy P1 generated by the load state.

Figure 2:
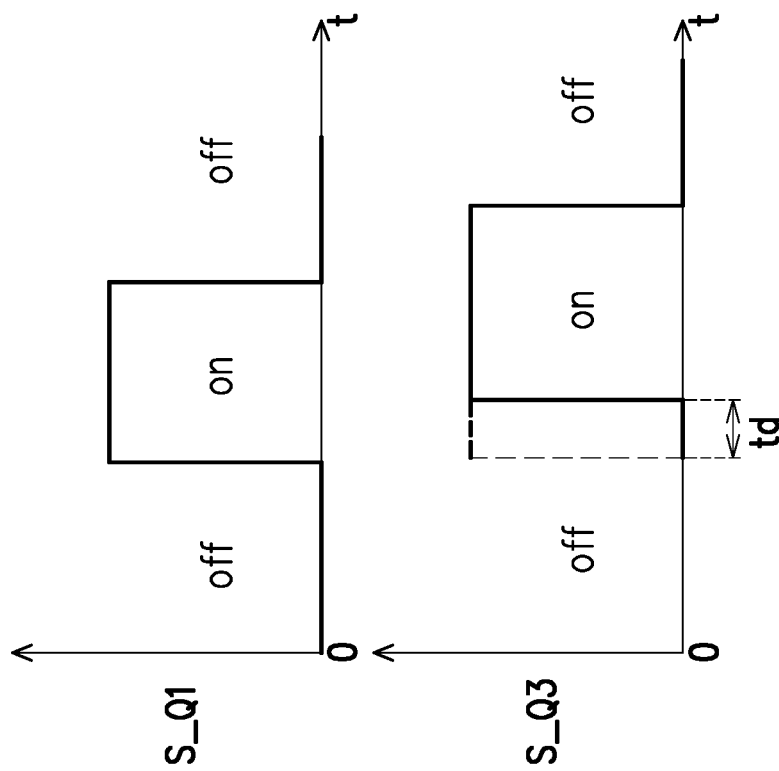
FIG. 2 is a schematic diagram showing the relationship between the voltage difference between the first terminal and the second terminal of the first switch and the conduction state of the second switch according to an embodiment of the disclosure.

Please refer to FIG. 1 and FIG. 2 at the same time. FIG. 2 is a schematic diagram showing the relationship between the voltage difference between the first terminal and the second terminal of the first switch and the conduction state of the second switch according to an embodiment of the disclosure. FIG. 2 shows the voltage difference VDS_Q2 between the first terminal and the second terminal of the first switch Q2 and the conduction state S_Q3 of the second switch Q3. The first switch Q2 has a parasitic capacitance C2. The parasitic capacitance C2 is located between the first terminal and the second terminal of the first switch Q2. The parasitic capacitance C2 stores the first energy P1. Therefore, even if the first switch Q2 is turned off at the time point t1 in response to the control signal SC2, the parasitic capacitor C2 still stores the first energy P1. Therefore, the voltage difference VDS_Q2 between the first terminal and the second terminal of the first switch Q2 is not zero. The first energy P1 of the parasitic capacitor C2 is completely discharged at the time point t2 (i.e., when VDS_Q2 is equal to 0). There is a delay period td between the time point t2 and the time point t1. Therefore, according to the ZVS rule, the second switch Q3 is not to be turned on until the first energy P1 stored in the parasitic capacitor C2 is completely discharged at the time point t2. The timing of the control signal SC3 is delayed, as denoted by the delay period td. Therefore, the turn-on time point of the second switch Q3 is delayed from the time point t3 to the time point t4.

Figure 3:
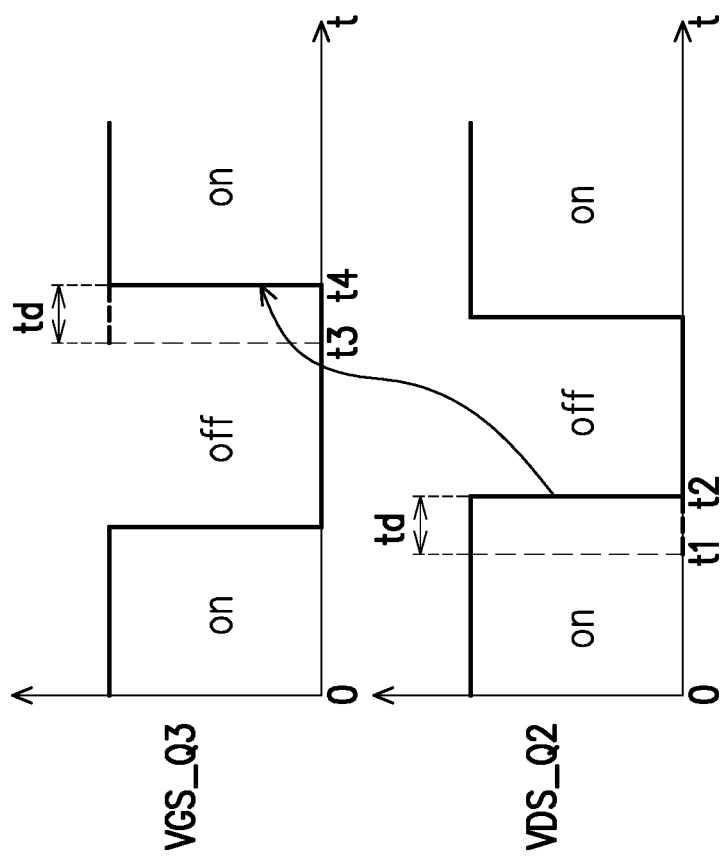
FIG. 3 is a schematic diagram showing the relationship between the conduction state of the power switch and the conduction state of the first switch according to an embodiment of the disclosure.

Next, please refer to FIG. 1 and FIG. 3 at the same time. FIG. 3 is a schematic diagram showing the relationship between the conduction state of the power switch and the conduction state of the first switch according to an embodiment of the disclosure. FIG. 3 shows the conduction state S_Q1 of the first switch Q2 and the conduction state S_Q3 of the second switch Q3. In this embodiment, when the control signals SC1 and SC3 simultaneously change from a low voltage level to a high voltage level, due to the first energy P1 stored in the parasitic capacitor C2, the turn-on time point of the second switch Q3 is delayed, as denoted by the delay period td, according to the ZVS rule. Therefore, the first time point when the second switch Q3 goes from the off state to the on state is not the same as the second time point when the power switch Q1 goes from the off state to the on state. In this embodiment, the greater the first energy P1 is, the longer the delay period td of the turn-on time point of the second switch Q3 is, and the smaller the first energy P1 is, the shorter the delay period td of the turn-on time point of the second switch Q3 is.

Again in the embodiment of FIG. 1 the boost circuit 110 may be a boost power factor corrector. The booster circuit 110 further includes a diode DO1 and a capacitor C01 (but the disclosure is not limited thereto). The boost inductor LM1 is coupled between the anode of the diode DO1 and the rectified power source VR. The first terminal of the power switch Q1 is coupled to the anode of the diode DOL. The second terminal of the power switch Q1 is coupled to a first reference low voltage (e.g., the first ground terminal). The control terminal of the power switch Q1 receives the control signal SC1. Depending on the requirements of the load state, the power switch Q1 performs a switching operation in response to the control signal SC1 to determine the energy stored in the boost inductor LM1. The first terminal of the capacitor C01 is coupled to the cathode of the diode DOL. The second terminal of the capacitor C01 is coupled to the first reference low voltage. The first terminal of the capacitor CO1 serves as the output terminal of the booster circuit 110.

Regarding the LLC converter 120, the first terminal of the second switch Q3 is coupled to the output terminal of the boost circuit 110. The second terminal of the second switch Q3 is coupled to the first terminal of the first switch Q2. The control terminal of the second switch Q3 receives the control signal SC3. The second terminal of the first switch Q2 is coupled to the first reference low voltage. The control terminal of the first switch Q2 receives the control signal SC2. The first terminal of the first inductor LX1 is coupled to the first terminal of the first switch Q2. The second terminal of the first inductor LX1 is coupled to the first reference low voltage.

In some embodiments, the control signals SC1 to SC3 may be provided by, for example, a controller (not shown). The control signals SC1 and SC3 are not simultaneously provided when the power supply 100 is activated. In this way, when the power supply 100 is activated, the first time point when the second switch Q3 goes from the off state to the on state (that is, the time when the rising edge of the control signal SC3 occurs) and the second time point when the power switch Q1 goes from the off state to the on state (that is, the time when the rising edge of the control signal SC1 occurs) are not the same. In addition, the controller may also detect the timing of the control signal SC3. Upon detecting that the timing of the delayed rising edge of the control signal SC3 and the timing of the rising edge of the control signal SC1 are the same, the controller adjusts the timing of one of the control signals SC1 and SC3.

In some embodiments, the LLC converter 120 also includes a second inductor (not shown). The second inductor obtains a second energy in response to the load state of the output terminal of the power supply 100. In these embodiments, the second inductor and the first inductor LX1 are coupled in series between the first terminal of the first switch Q2 and the first reference low voltage. The time point when the first terminal and the second terminal of the first switch Q2 have zero voltage difference is further delayed dynamically in response to the load state of the output terminal. According to the ZVS rule, the dynamic delay of the time point of zero voltage difference as described above then causes the turn-on time point of the second switch Q3 to be delayed dynamically based on the load state of the output terminal. Therefore, the first time point when the second switch Q3 goes from the off state to the on state is not the same as the second time point when the power switch Q1 goes from the off state to the on state.

Furthermore, the LLC converter 120 further includes a resistor R1, a resonant tank 121, a transformer TR, and an output circuit 122. The first terminal of the resistor R1 is coupled to the first terminal of the first switch Q2. The resonant tank 121 includes a resonant inductor LR, a magnetizing inductor LM2, and a resonant capacitor CR. The resonant inductor LR, the magnetizing inductor LM2, and the resonant capacitor CR are coupled in series between the second terminal of the resistor R1 and the first reference low voltage. For example, the first terminal of the resonant inductor LR is coupled to the second terminal of the resistor R1. The first terminal of the magnetizing inductor LM2 is coupled to the second terminal of the resonant inductor LR. The first terminal of the resonance capacitor CR is coupled to the second terminal of the magnetizing inductor LM2. The second terminal of the resonance capacitor CR is coupled to the first reference low voltage.

It is worth mentioning here that the resistor R1 prevents the resonant tank 121 from being affected by the inductive coupling of the first inductor LX1 during the resonant operation.

The transformer TR is coupled to the magnetizing inductor LM2. The transformer TR converts the first power source at the magnetizing inductor LM2 to generate a second power source. The output circuit is coupled to the transformer. The output circuit 122 generates the output voltage VOUT based on the second power source.

The following paragraphs describe the implementation details of the transformer and the output circuit. Please refer to FIG. 4, which is another schematic diagram according to the first embodiment. A transformer TR includes a primary side coil NP and secondary side coils NS1 and NS2. The primary side coil NP is coupled in parallel with a magnetizing inductor LM2. The first terminal of the secondary side coil NS1 and the first terminal of the secondary side coil NS2 are connected to a second reference low voltage (e.g., the second ground terminal). The output circuit 122 includes output diodes D02 and D03 and an output capacitor CO2. The anode of the first output diode D02 is coupled to the second terminal of the secondary side coil NS1. The cathode of the first output diode D02 is coupled to the output terminal of the output circuit 120. The anode of the output diode D03 is coupled to the second terminal of the secondary side coil NS2. The cathode of the output diode D03 is coupled to the output terminal of the output circuit 120. The first terminal of the output capacitor CO2 is coupled to the output terminal of the output circuit 120. The second terminal of the output capacitor CO2 is coupled to the second reference low voltage.

In addition, the power supply 100 may further include a rectifier 130. The rectifier 130 receives an input power VIN, and rectifies the input power VIN to generate a rectified power VR. In this embodiment, the rectifier 130 may be a full-bridge rectifier (but the disclosure is not limited thereto).

Figure 4:
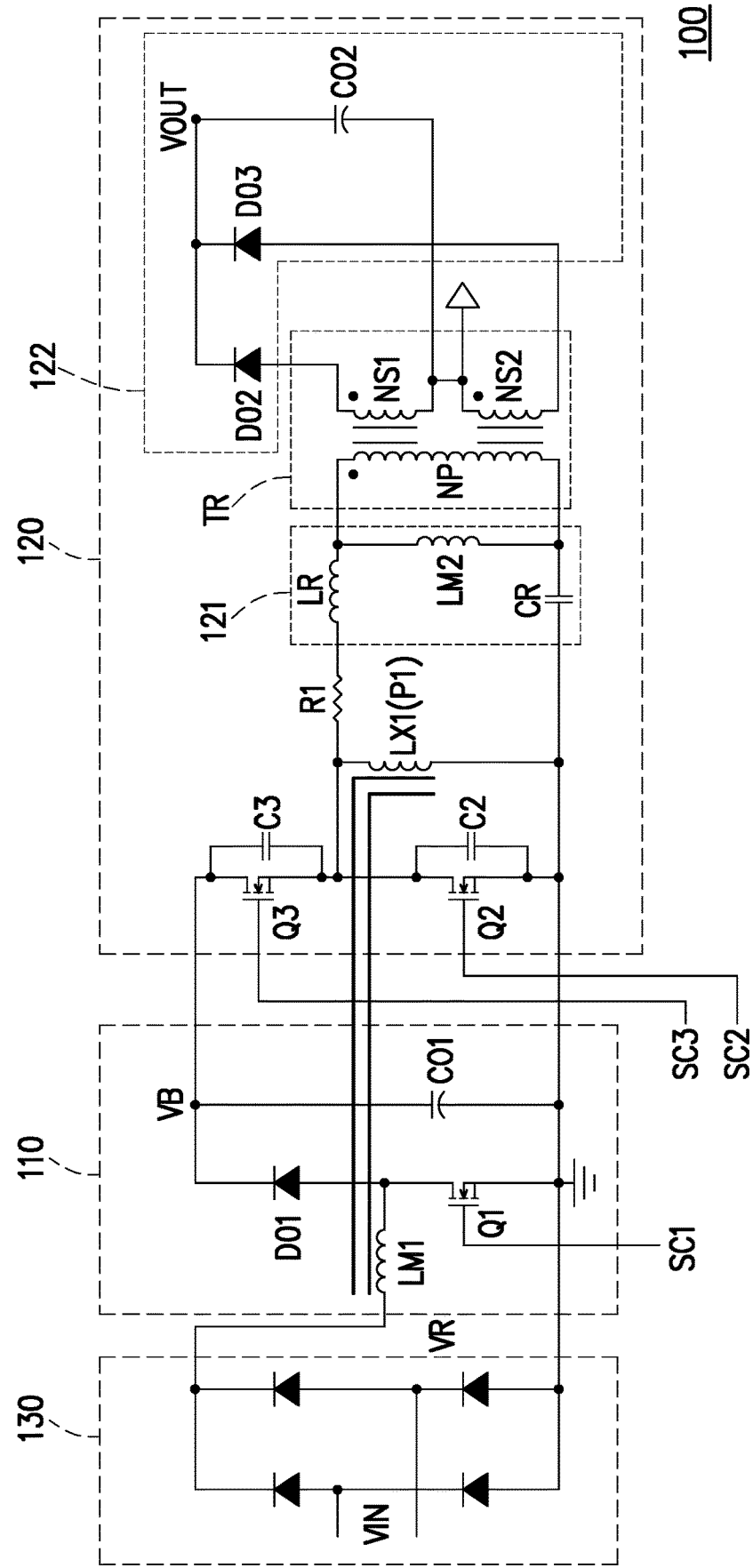
FIG. 4 is another schematic diagram according to the first embodiment.
Figure 5:
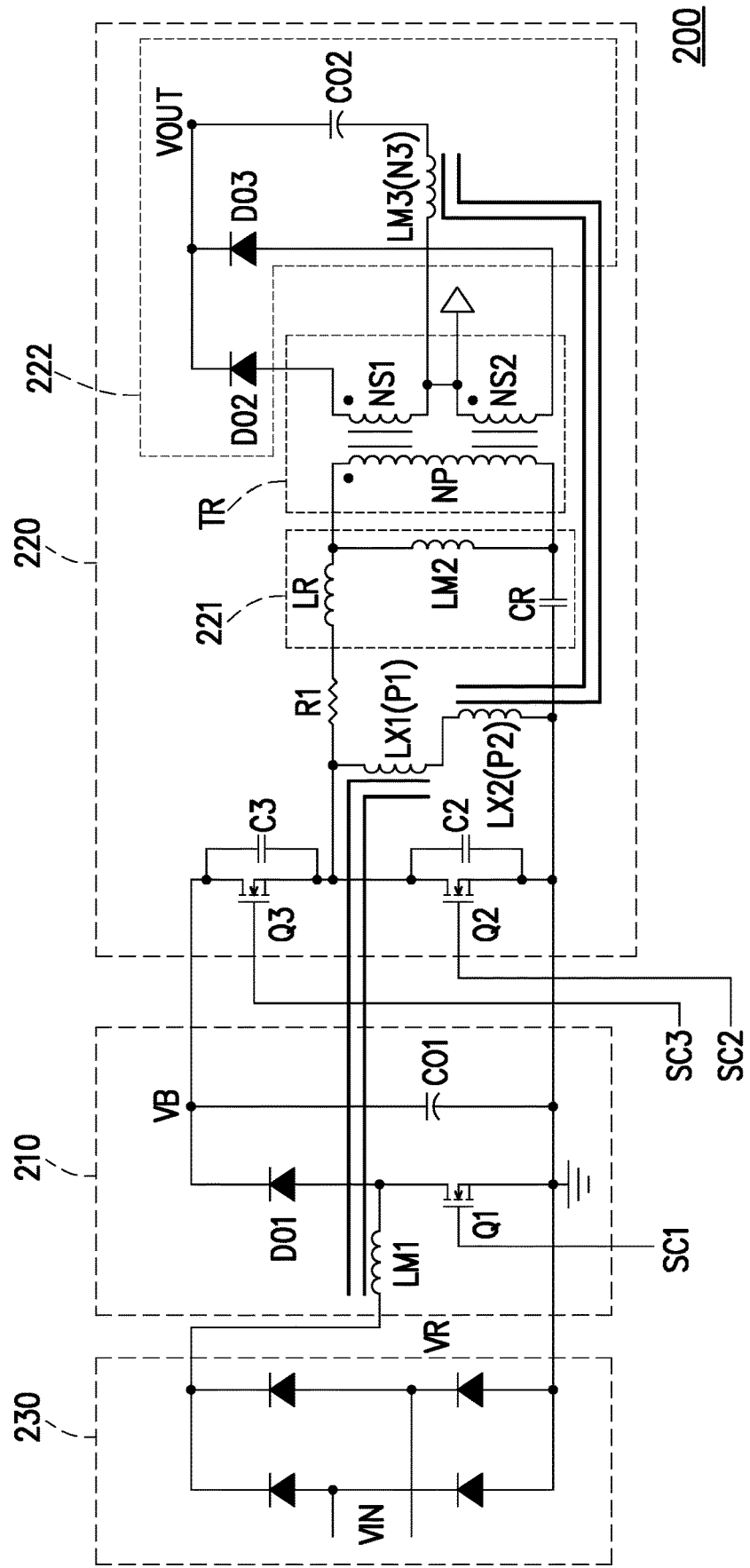
FIG. 5 is a schematic diagram of a power supply according to a second embodiment of the disclosure.

Please refer to FIG. 5, which is a schematic diagram of a power supply according to a second embodiment of the disclosure. The power supply 200 includes a boost circuit 210, an LLC converter 220, and a rectifier 230. In this embodiment, the implementation of the boost circuit 210 may be sufficiently taught from the embodiments of FIG. 1 and FIG. 4, and the same description is not repeated hereinafter. The implementation of the rectifier 230 may be sufficiently taught from the embodiment of FIG. 4, and the same description is also not repeated hereinafter.

Compared with the LLC converter 120 in FIG. 4, the LLC converter 220 of this embodiment further includes a detection inductor LM3 and a second inductor LX2. In this embodiment, the detection inductor LM3 is coupled between the second terminal of the output capacitor CO2 and the second reference low voltage. The detection inductor LM3 stores energy in response to the load at the output terminal of the power supply. In this embodiment, the detection inductor LM3 may be disposed in the output circuit 222. The second inductor LX2 is coupled between the second terminal of the first inductor LX1 and the first reference low voltage. The second inductor LX2 is inductively coupled with the detection inductor LM3 to obtain a second energy P2.

For example, the second inductor LX2, the detection inductor LM3, and a magnetic conductive element (e.g., an iron core) form an inductive coupling circuit, to which the disclosure is not limited.

In this embodiment, the time point when the first terminal of the first switch Q2 and the second terminal of the first switch Q2 have zero voltage difference is delayed dynamically in response to the sum of the first energy P1 and the second energy P2. And the turn-on time point of the second switch Q3 is therefore delayed dynamically. In other words, the turn-on time point of the second switch Q3 may be delayed dynamically in response to the load state of the output terminal of the power supply 200 and the load state of the booster circuit 210. In this embodiment, the greater the sum of the first energy P1 and the second energy P2, the longer the delay period of the turn-on time point of the second switch Q3. The smaller the sum of the first energy P1 and the second energy P2 is, the shorter the delay period of the turn-on time point of the second switch Q3 is.

In this embodiment, the resistor R1 prevents the resonant tank 221 from being affected by the inductive coupling of the first inductor LX1 and the inductive coupling of the second inductor LX2 when the resonant tank 221 performs the resonant operation.

To sum up, the power supply includes a boost circuit and an LLC converter. The first inductor of the LLC converter is inductively coupled with the boost inductor of the boost circuit to obtain the first energy. The time point when the first terminal of the first switch and the second terminal of the first switch have zero voltage difference is delayed dynamically in response to the first energy, and the turn-on time point of the second switch may be delayed dynamically in response to the load state of the booster circuit. In this way, the first time point when the second switch goes from the off state to the on state is not the same as the second time point when the power switch goes from the off state to the on state, thereby reducing the annoying noises generated by the second switch and the power switch switched to the conducting state at the same time. The LLC converter further obtains the second energy in response to the load state of the output terminal of the power supply. In this way, the turn-on time point of the second switch can also be delayed dynamically in response to the load state of the output terminal of the power supply.

Although the disclosure has been disclosed in the above embodiments, they are not meant to limit the disclosure. Anyone with common, general knowledge in the art can make changes and modifications without departing from the spirit and scope of the disclosure. The scope of the disclosure shall be determined by the scope of the claims.

What is claimed is:
1. A power supply, comprising:
 a boost circuit, comprising a boost inductor and a power switch, and configured to operate in response to switch- ing of the power switch to boost a rectified power supply and generate a boosted power supply; and an LLC converter, coupled to the boost circuit, comprising a first inductor, a first switch, and a second switch, and configured to control the first switch and the second switch according to a zero-voltage switching rule to convert the boosted power supply to an output power supply, wherein the first inductor is inductively coupled with the boost inductor to obtain a first energy, and in response to the first energy, a time point when a first terminal of the first switch and a second terminal of the first switch have zero voltage difference is delayed, such that a turn-on time point of the second switch lags behind a turn-on time point of the power switch.

2. The power supply of claim 1, wherein the greater the first energy is, the longer a delay period of the turn-on time point of the second switch is.

3. The power supply of claim 1, wherein:
a parasitic capacitance of the first switch stores the first energy, and
the parasitic capacitance is located between the first terminal of the first switch and the second terminal of the first switch.

4. The power supply of claim 1, wherein:
a first terminal of the second switch is coupled to an output terminal of the boost circuit,
a second terminal of the second switch is coupled to the first terminal of the first switch,
the second terminal of the first switch is coupled to a first reference low voltage,
a first terminal of the first inductor is coupled to the first terminal of the first switch, and
a second terminal of the first inductor is coupled to the first reference low voltage.

5. The power supply of claim 4, wherein the LLC converter further comprises:
a second inductor, coupled in series with the first inductor between the first terminal of the first switch and the first reference low voltage, and configured to obtain a second energy in response to a load of an output terminal of the power supply.

6. The power supply of claim 4, wherein the LLC converter further comprises:
a resistor, having a first terminal coupled to the first terminal of the first switch;
a resonant tank, comprising a resonant inductor, a magnetizing inductor, and a resonant capacitor coupled in series, wherein the resonant tank is coupled between a second terminal of the resistor and the first reference low voltage;

a transformer, coupled to the magnetizing inductor, and configured to convert a first power source at the magnetizing inductor to generate a second power source; and an output circuit, coupled to the transformer, and configured to generate an output voltage based on the second power source.

7. The power supply of claim 6, wherein the resistor is configured to prevent the resonant tank from being affected by inductive coupling of the first inductor during resonant operation.

8. The power supply of claim 6, wherein:
the transformer comprises:
a primary side coil, coupled in parallel with the magnetizing inductor;
a first secondary coil; and
a second secondary side coil, wherein a first terminal of the second secondary side coil and a first terminal of the first secondary side coil are connected to a second reference low voltage; and
the output circuit comprises:
a first output diode, having an anode coupled to a second terminal of the first secondary side coil and a cathode coupled to an output terminal of the output circuit;
a second output diode, having an anode coupled to a second terminal of the second secondary side coil and a cathode coupled to the output terminal of the output circuit; and
an output capacitor, having a first terminal coupled to the output terminal of the output circuit and a second terminal coupled to the second reference low voltage.

9. The power supply of claim 8, wherein the LLC converter further comprises:
a detection inductor, coupled between the second terminal of the output capacitor and the second reference low voltage, and configured to store energy in response to a load of an output terminal of the power supply; and
a second inductor, coupled between the second terminal of the first inductor and the first reference low voltage, and inductively coupled with the detection inductor to obtain a second energy.

10. The power supply of claim 9, wherein, in response to a sum of the first energy and the second energy, the time point when the first terminal of the first switch and the second terminal of the first switch have zero voltage difference is delayed dynamically, such that the turn-on time point of the second switch is delayed dynamically.

* * * * *